INVENTOR.
William F. Laser,
BY Wolfe, Hubbard,
Voit & Osann
Attorneys.

United States Patent Office 3,061,318
Patented Oct. 30, 1962

3,061,318
ROTARY SEAL WITH FLEXIBLE STATOR
William F. Laser, Evanston, Ill., assignor to City National Bank and Trust Company of Chicago, as trustee under the Cartridge Type Seal Liquidation Trust
Filed Aug. 13, 1959, Ser. No. 833,524
1 Claim. (Cl. 277—39)

This invention relates to rotary seals and concerns more particularly a floating rotor, labyrinth-type seal.

In applicant's co-pending application Serial No. 508,029 filed May 13, 1955, now U.S. Patent No. 2,917,329, issued December 15, 1959, there is disclosed a novel labyrinth seal especially well suited for efficient operation at extremely high temperatures and rates of rotation. A seal of this type is capable of functioning effectively at shaft rotation speeds of up to 150,000 r.p.m. and at temperatures of up to 1,400° F. As set forth in the application referred to, these seals depend in part for their effective operation upon the rate of rotation of the shaft being sealed. Under static, non-rotating conditions, seals of this type are less effective. Furthermore, considerable exactness and precision in construction and assembly of such seals is required.

It is therefore an object of the present invention to provide a rotary seal capable of very high speed, high temperature operation that also functions effectively under static conditions. In more detail, it is an object of the invention to provide such a seal in which a very light force maintains the sealing elements in sealing contact under static conditions without interfering with the seal's effective action at very high speeds and temperatures.

It is also an object to provide a seal of the above character in which precise spacing and adjustment of the sealing parts is achieved through a simple flexible mounting so that the seal can be inexpensively manufactured.

In one of its aspects, it is an object of the invention to unite a thin flexible member as an integral part of a rotary seal without damaging the flexible member or affecting the hardness of metallurgy of the other seal parts.

Other objects and advantages of the invention will become apparent upon reading the following detailed description and upon reference to the drawing in which.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claim.

Figure 1:
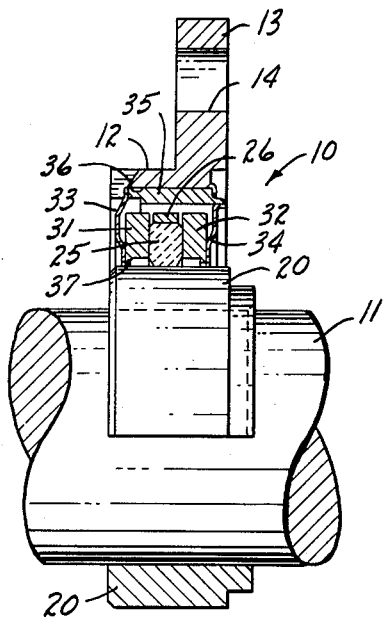
FIGURE 1 is a fragmentary section of a shaft assembly showing a seal embodying the present invention, taken along a portion of the line 1—1 in FIG. 2.
Figure 2:
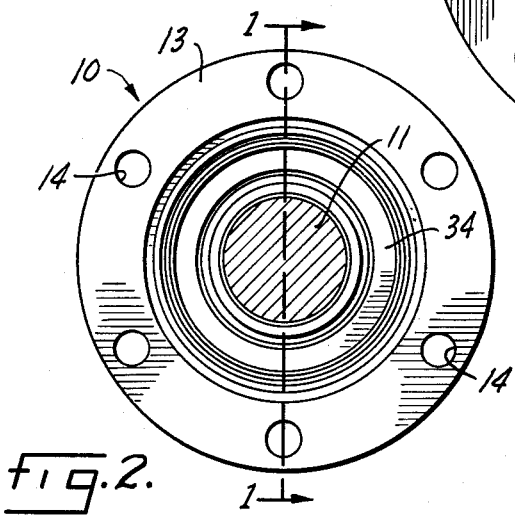
FIG. 2 is an elevation of the seal shown in FIG. 1 with the shaft of the assembly being shown in section.

Turning now to FIGS. 1 and 2 of the drawings, there is shown a seal 10 embodying the invention and arranged to cooperate with a rotatably mounted shaft 11. In its illustrated form, the seal 10 includes a housing or casing 12 having a flange portion 13 through which are provided a plurality of bolt holes 14. Thus, the casing 12 can be rigidly secured to the wall of the structure which is to be protected by the seal 10.

Preferably, the seal 10 cooperates with a sleeve 20 carried as virtually an integral part of the shaft 11. If convenient, the sleeve 20 can be eliminated and the outer surface of the shaft itself can be properly finished to work effectively with the seal.

In keeping with the construction of seals of this type, the seal 10 includes an annular rotor 25 having two lapped sealing surfaces on its opposite flat sides and an interior cylindrical sealing surface which slidably fits on the outer cylindrical surface of the sleeve 20. The rotor 25 and the sleeve 20 are formed of materials having differing thermal coefficients of expansion so that when the seal parts are brought up to what is to be their normal operating temperatures, the rotor will seize on the sleeve 20. For high temperature installations, the rotor is usually formed of carbon and the sleeve of steel. The interaction of these parts is explained quite fully in the application referred to above. Since carbon is a somewhat fragible material, the rotor 25 is surrounded by a tightly fitted steel retainer ring 26 which serves to restrain the rotor from flying apart under the centrifugal forces developed during operation.

The rotor 25 of the seal 10 is disposed within an inwardly opening annular chamber formed by the casing 12 and a pair of annular rings 31 and 32. The rings 31, 32 have opposed flat lapped sealing surfaces which face the flat sealing surfaces of the rotor 25.

Pursuant to the invention, the ring 31 is carried by a resilient annular diaphragm which is united to the ring and the casing so as to form a fluid impervious, flexible wall. In the embodiment of FIG. 1, both the ring 31 and the ring 32 are carried by resilient diaphragms 33 and 34, respectively, and the diaphragms are anchored to a casing liner 35 that is sealed within the casing proper. To carry out the invention, the diaphragm 33 is mounted in a slightly deflected condition so as to exert a light force urging the rings 31, 32 and the rotor 25 into sandwiched sealing relationship under static conditions.

Preferably, the diaphragms 33, 34 are formed of stainless steel. To unite them with the casing liner 35 and their respective rings, the liner and the rings are formed with thin annular portions having thicknesses approximately equal to the thickness of the diaphragm material. Thus, the liner 35 is provided with a thin lip portion 36 to which the outer edge of the diaphragm is secured and the ring 31 is provided with a thin lip 37 to which the inner edge of the diaphragm 33 is united. To form a gas tight union between the diaphragm and its attached parts, the outer and inner peripheries of the diaphragm are heli-arc welded to the thin lip portions 36 and 37. Since elements of approximately equal thickness are welded, the edges fuse evenly without overheating and damaging the thin diaphragm as would be the case if an attempt were made to weld the diaphragm directly to a relatively massive block of metal.

Also, by uniting the diaphragm to relatively thin portions of the rings 31, 32, the welding heat required is minimized and fairly well isolated from the inner sealing faces of the rings. Thus, the welding operation does not adversely affect the hardness or metallurgy of the ring sealing faces.

It is also important to note that the diaphragm 33, 34 are joined to the rings 31, 32 at the inner edges of the latter opposite to the ring sealing surfaces. The diaphragms are also spaced from the outer surfaces of the rings and thus approximately equal areas on either side of the diaphragms are exposed to the pressures being sealed. The seal is therefore substantially pressure-balanced and capable of withstanding and effectively sealing very high pressures.

Figure 3:
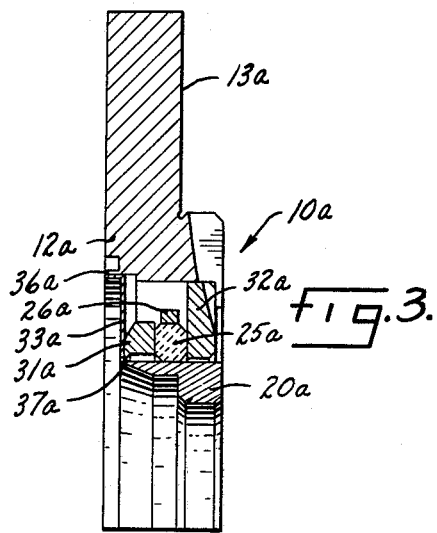
FIG. 3 is a fragmentary section similar to FIG. 1 of a modified seal embodying the invention and which is taken along a portion of the line 3—3 of FIG. 4.
Figure 4:
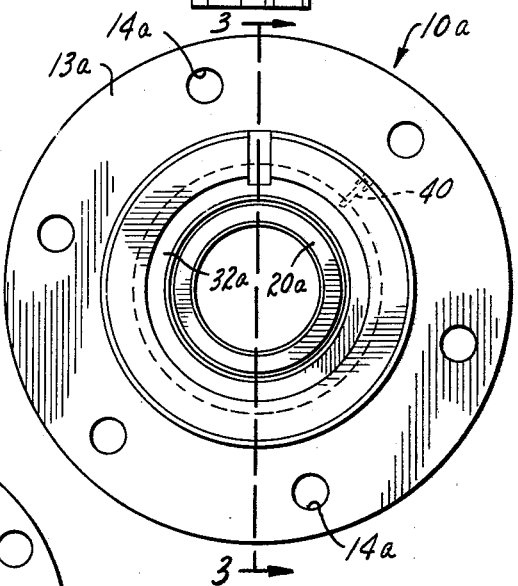
FIG. 4 is an elevation of the seal shown in FIG. 3.

Turning to the modification shown in FIGS. 3 and 4, it will be observed that parts corresponding to those previously described have been given the same identifying reference numerals with the distinguishing suffix "a"

added. Thus, FIGS. 3 and 4 show a seal 10a having a casing 12a formed with a flange 13a that is provided with a plurality of bolt holes 14a. The seal 10a cooperates with a sleeve 20a adapted to be secured on a rotatable shaft.

The sealing elements of the seal 10a include a rotor 25a slidably mounted on the sleeve 20a and fitted between a pair of rings 31a and 32a. In this embodiment, the ring 32a is closely fitted within the casing 12a and is locked against rotation to the casing by a pin 40. The ring 32a thus forms a fixed wall for the inwardly opening annular chamber in which the rotor 25a is positioned.

In keeping with the invention, the ring 31a is carried by a flexible stainless steel diaphragm 33a which is welded to an annular lip portion 36a on the casing 12a and a lip portion 37a on the ring 31a. The diaphragm 33a is mounted so as to exert a light force urging the rings 31a, 32a and the rotor 25a into sandwiched sealing relationship under static conditions.

Referring briefly to the operation of the seals 10 and 10a, it will be noted that the light resilient force exerted by the diaphragms is effective to keep the sealing surfaces of the rings and rotors in sealing engagement. Since the diaphragms are flexible, the rings supported thereby are in effect "floating," and hence they readily adjust to the position of the adjacent rotor so as to get good sealing engagement between their respective sealing surfaces. Since the seals are to this extendt self-adjusting, their assembly and construction is economical and rapid.

Since the sealing parts are in sealing engagement under static conditions, it can be seen that the seal effectively prevents passage of hot gases when, for example, a sudden surge of gas strikes the seal before normal temperatures and shaft speeds are attained.

Under high speed, high temperature operating conditions, the carbon rotors seize on the shaft sleeves and therefore are driven at high speeds by the shaft. The rapidly rotating rotors act as centrifugal pump members and build up a region of high gas pressure within the annular chambers defined by the seal casings and the opposed sealed rings. This high pressure forms a block which prevents passage of gas through the seal. This operation is described in some detail in the application previously referred to and identified above.

It can be seen that although the seals 10 and 10a are used in very high pressure applications, the pressure does not distort the thin flexible diaphragms since these members are in substantial pressure balance. That is, the pressure on the outside of the diaprhagm is balanced by the pressure built up within the chamber surrounding the rotor.

It can be appreciated that the seals 10 and 10a are thus able to economically provide an effective sealing action under both static conditions and at extremely high temperatures and high shaft speeds.

I claim as my invention:

A rotary seal comprising, in combination, a casing defining a cylindrical chamber, means forming an annular wall at one end of said chamber, an annular rotor disposed in said chamber, said rotor having one sealing surface abutting said wall and a second sealing surface facing the opposite direction, an annular stator ring disposed adjacent said rotor so as to sandwich the rotor between the stator ring and said wall, said casing and said stator ring having thin annular lip portions, said ring having a sealing surface facing said second sealing surface of the rotor, and a thin resilient metal diaphragm welded at its outer and inner peripheries to said thin annular lip portions of both said casing and said stator ring to form a fluid impervious, flexible wall, said annular lip portions having thicknesses approximately equal to the thickness of said diaphragm, said diaphragm being slightly deflected so as to exert a light force urging the stator ring against the rotor and the rotor against said annular wall thereby holding all of said sealing faces in sealing engagement under static conditions.

References Cited in the file of this patent
UNITED STATES PATENTS

| | | |
|---|---|---|
| 1,033,237 | De Ferranti | July 23, 1912 |
| 2,538,987 | Synek | Jan. 23, 1951 |
| 2,584,679 | Dobrosavljevic | Feb. 5, 1952 |
| 2,699,366 | Heinrich | Jan. 11, 1955 |
| 2,866,655 | Stanbro | Dec. 30, 1958 |